Oct. 13, 1970   J. F. BOYER ET AL   3,533,611
FURNACE VENTILATION SYSTEM
Filed June 6, 1968   2 Sheets-Sheet 1

INVENTORS
JAMES F. BOYER
ALFRED E. KROLL
ATTYS.

Oct. 13, 1970      J. F. BOYER ET AL      3,533,611
FURNACE VENTILATION SYSTEM
Filed June 6, 1968      2 Sheets-Sheet 2

INVENTORS
JAMES F. BOYER
ALFRED E. KROLL

McDougall, Hersh, Scott, & Ladd
ATTYS.

United States Patent Office 3,533,611
Patented Oct. 13, 1970

3,533,611
FURNACE VENTILATION SYSTEM
James F. Boyer and Alfred E. Kroll, Mishawaka, Ind., assignors to The Wheelabrator Corporation, Mishawaka, Ind., a corporation of Delaware
Filed June 6, 1968, Ser. No. 734,967
Int. Cl. C21c 5/40; F27d 17/00
U.S. Cl. 266—15                                8 Claims

ABSTRACT OF THE DISCLOSURE

Gas evacuation and furnace ventilation means for furnaces comprising a first gas-flow conduit system in open communication with a gaseous discharge opening in the furnace roof, and a second gas-flow conduit system in open communication with other openings in the furnace. Each of the conduit systems communicates with a gas-evacuation system leading to a prime gas mover. Each of the conduit systems has control dampers at its outlet, the damper in the first conduit system being the furnace pressure control damper, arranged to be manually controlled or automatically controlled by furnace-pressure responsive means during the melting cycle. Switch means in the pressure control circuit operate to close off the second gas-flow conduit system during the melting cycle. During refining and slagging, the switch means are operated to close the damper in the first conduit system and take the furnace pressure control out of service while opening the dampers in the second conduit system.

---

This invention relates to industrial furnaces and more particularly to improved methods and means for establishing optimum pressure and ventilation conditions within such furnaces, while guarding against undesirable atmospheric furnace operation.

It is well known that in the operation of electric arc furnaces or other types of smelting, melting or refining furnaces, large volumes of dust and gaseous fumes are generated. It is desirable that these be removed so that they will not interfere with the operations of the furnace and it is desirable that the removal not be allowed to release dust and fumes into the atmosphere of the room.

In typical systems, the carbon-monoxide and other combustible gases contained in the fumes are burned and the dust then collected in fabric bag filtering systems. To carry out this treatment of the discharging dust and gases, systems known in the art as "direct shell evacuation" have been used. These perform ably from the standpoint of dust treatment and gas combustion or oxidation, however, the powerful suction means utilized create undesirable atmospheric conditions during certain phases of the melt within the furnace by reducing the pressure therein with resultant inflow of ambient air.

The movement of oxidizing air into the furnace and its flow therefrom into the exhaust system not only has an undesirable cooling effect but may have a decarbonizing effect on certain types of melt, requiring in many cases, the addition of carbon to the melt to maintain the desired carbon content at the tap. It is also required, in the operation of electric arc furnaces, to open the furnace doors for adding alloys, for treating or removing slag, or for oxygen lancing. The large influx of air during such open-door operations generates conditions where dust and gases puff out of the furnace openings such as those in the furnace roof through which the carbon electrodes are passed. This puffing out of dust and gases creates undesirable dust condition in the furnace room.

It is an object of this invention to provide an electric arc furnace ventilation system which will efficiently dispose of gases and fumes issuing therefrom while providing desired atmospheric conditions within the furnace.

Further objects and advantages of the invention will appear from the following description of a presently preferred embodiment thereof, read in connection with the accompanying drawing, in which.

The instant invention generally consists of an arrangement providing a first gas-evacuation conduit system which receives furnace gases and dust through a main outlet in the furnace roof, and a second gas-evacuation conduit system which receives furnace gases which may be issuing through the other openings, each of these conduit systems being arranged to also receive some inflow of ambient air thereinto. The main outlet will normally be in the furnace roof but it could be located in another part of the furnace.

The respective conduit systems are arranged to discharge commonly into a dust and fume collection system such as that disclosed in U.S. Pat. No. 3,173,980, issued on Mar. 16, 1965. In such a system, transport of the furnace gases and fumes to filtering and disposal means is accomplished without the imposition of any substantial suction or reduced pressure condition within the furnace.

In carrying out the objects of the invention, each of the conduit systems is provided with automatic or hand operated damper means which can be adjusted to set up the most desirable gas flow conditions. The damper apparatus in the first conduit is arranged for manual operation or automatic operation by means responsive to furnace pressure, whereby during the melting cycle, optimum pressure conditions may be maintained for the specific melt in progress. During refining and slagging, the operation of selector switch means in the control circuits for the damper in the first conduit system may be operated to closed or partially closed position and dampers in the second control system opened. Gases escaping through other openings such as the electrode ports will then be collected by the second conduit system.

The invention is especially useful with respect to electric arc furnaces for melting stainless steel or iron. The invention will be specifically described with respect to such a furnace, however, other applications of the invention are contemplated.

In melting certain types of metal in an electric arc furnace, a reducing atmosphere is desired over the bath during the refining period. Thus, in the case of stainless steel, carbide slags are used and an oxidizing atmosphere should be avoided. In melting iron, carbon oxidized from the melt must be replaced and, therefore, oxidation is undesirable. During the operation of the furnace, however, large amounts of gas are emitted and the gases which are high in carbon monoxide must be oxidized. Similarly, oils emitted must be burned.

In U.S. Pat. No. 3,173,980, there is disclosed a venting and ducting system through which the dust and fumes may be transported for filtering and other disposition. The ducting system includes means for generating a powerful suction at the discharge end. In view of the fact that the instant invention is not restricted to use with that specific ventilation system, only the inlet end thereof has been shown in FIGS. 1 and 2 and is identified as D.

Figure 1:
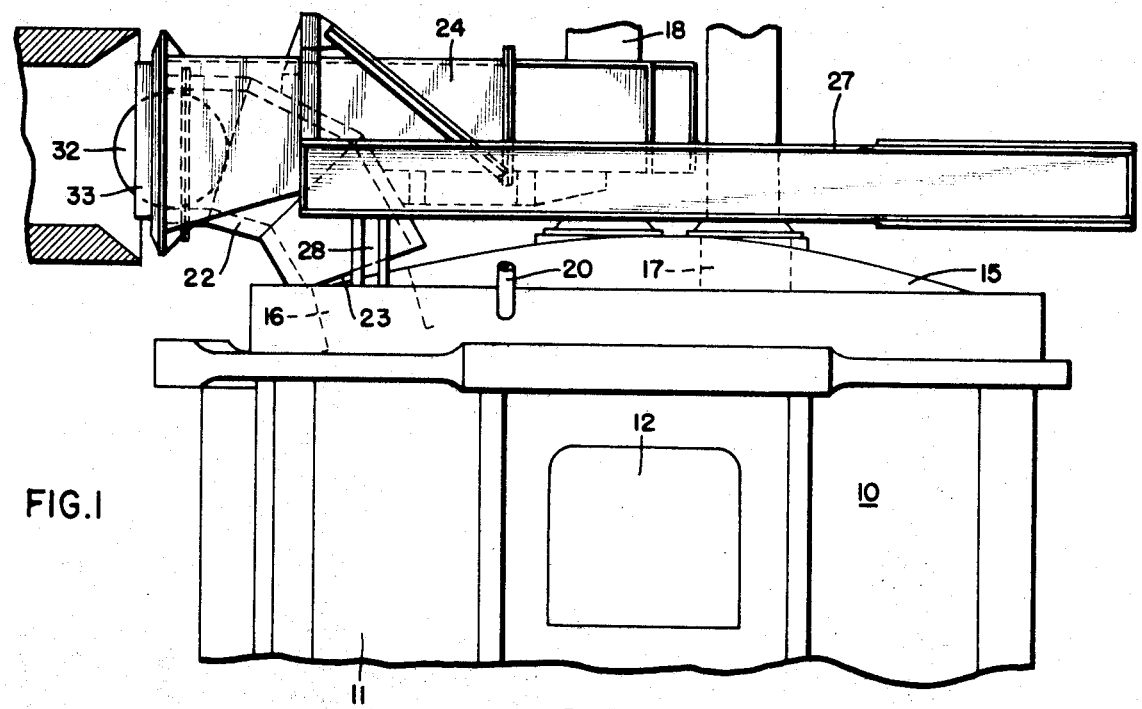
FIG. 1 is a fragmentary side elevation of an electric arc furnace equipped with ventilation and pressure control means embodying our invention.
Figure 2:
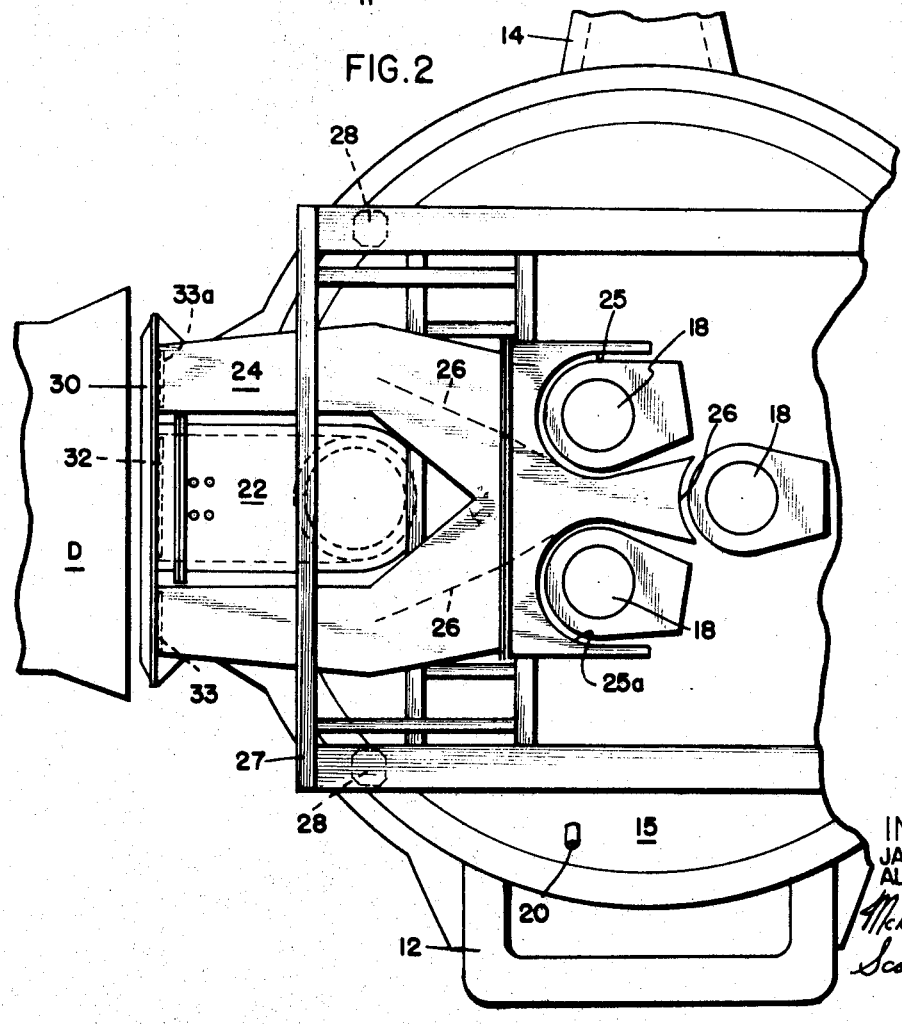
FIG. 2 is a fragmentary top plan view thereof.

FIGS. 1 and 2 illustrate an electric arc furnace 10 of a type commonly used to melt and refine steel and iron. The body portion 11 has a metal pouring spout 14 and slag door 12. It could have other openings such as a work door. By any conventional mechanisms (not shown), the furnace may be tilted or otherwise manipulated for pouring, slagging, charging and other operations.

The roof 15 of the furnace has an opening 16 for the outflow of dust and fumes generated within the furnace during the operation thereof. The roof also has openings 17 to accommodate the three carbon electrodes 18 of the furnace. These electrodes are arranged and supported to permit them to be raised or lowered relative to the furnace roof. A furnace pressure sensing device 20 enters the furnace body to permit measurement of the pressure conditions therein.

As noted, the ventilation system of this invention comprises a first gas flow conduit to receive the large amounts of dust and fumes issuing through the furnace opening 16, and a second conduit system 24 which picks up gases from other openings in the furnace. Each of these conduit or ventilation systems is equipped with selectively operable damper means.

The first gas flow conduit comprises an elbow structure 22, which because of the very high temperature of the gases issuing through the roof opening 16, may be enclosed in a water jacket. The inlet 23 of the elbow 22 is relatively close to, but nevertheless spaced from, the furnace roof. The inside diameter of the elbow structure is preferably larger than the furnace opening 16.

The second conduit system 24 is a composite structure having walls defining the respective side inlet openings 25, 25a and the center opening 26. All of these openings embrace, more or less, the electrodes 18 and are in position to receive any gaseous issue from the roof openings 17 and other furnace openings such as slag door 12 and pouring spout 14. The gases are passed through the main body of the second conduit system and are then passed into the ducting system D. Baffles 26 may be included within the conduit 24 to direct the gas flow. Appropriate changes may be made in the conduit system to accommodate any other openings a furnace may have.

Figure 3:
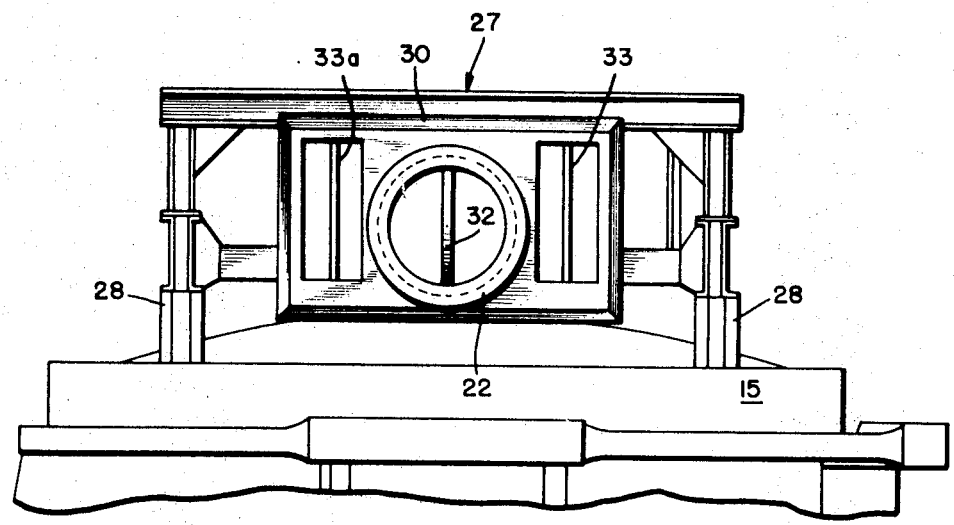
FIG. 3 is a fragmentary front elevational view thereof.

The respective conduit systems 22 and 24 are supported relative to the furnace by an appropriate framework 27 mounted on piers 28. The discharge openings for the conduit systems 22 and 24 are located within face plate 30 as shown in FIG. 3. The funnel mouth of the ducting system D embraces the entire area of the face plate and the conduit openings thereof, whereby the issue from said openings will flow into the system D.

The conduit systems 22 and 24 are equipped with damper mechanisms of appropriate shape. Conduit 22 has a damper 32, shown in the fully open position in FIGS. 1 and 3 and in the fully closed position in FIG. 2. The dampers 33 and 34a for the composite conduit system 24 are also shown in the open positions in FIGS. 1 and 3 and in the closed position in FIG. 2. All of the dampers are arranged for rotation and may be automatically or manually controlled.

Figure 4:
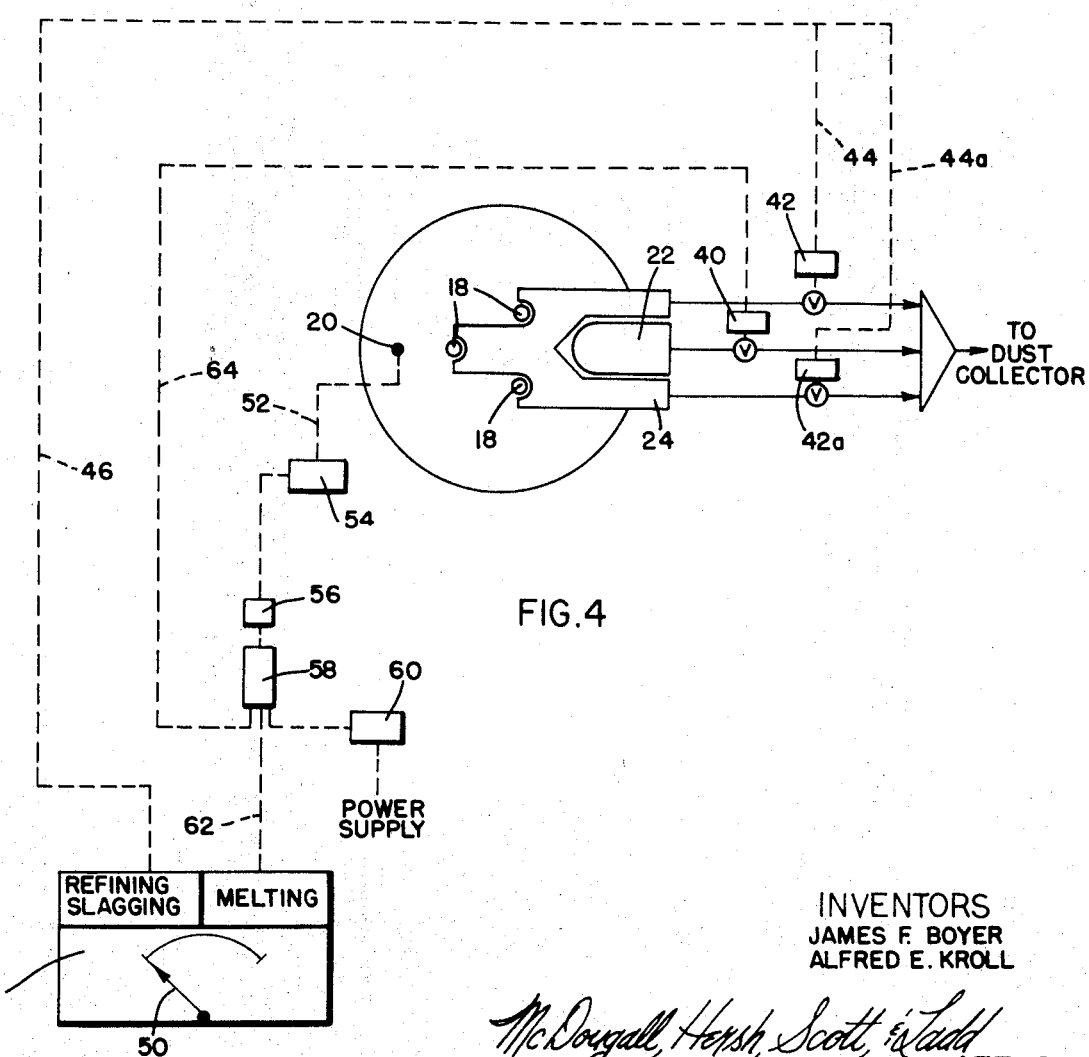
FIG. 4 is a schematic wiring diagram for the damper control means.

FIG. 4 illustrates a control system suitable for use in conjunction with the ventilating system described. In considering the control system, it will be appreciated that other systems could readily be developed for use in conjunction with the ventilation system of this invention.

In FIG. 4, the side draft conduit systems 22 and 24 are schematically illustrated. The damper 32 for the conduit 22 is controlled by a furnace pressure control valve 40. Shut-off valves 42 and 42a are provided for controlling the dampers 33 and 33a, respectively.

The valves 42 and 42a are connected through individual lines 44 and 44a and through common line 46 to control board 48. A selector 50 on the control board is adapted to be operated between "melting" and "refining-slagging" positions.

The furnace pressure senser 20 is connected through line 52 to a furnace pressure transmitter 54. The output of this transmitter is fed through DC power supply 56 to furnace pressure controller 58. A constant voltage transformer 60 is connected to a power supply which provides for operation of the pressure controller 58.

The control board 48 is connected through line 62 to the pressure controller, and line 64 provides a connection between the pressure controller and the valve 40.

When the control board is set in the "melting" position, the dampers 33 and 34a will be closed to a preset position through the operation of shut-off valves 42 and 42a. The damper 32 will be operated under the influence of valve 40, and the operation of this valve is determined by the pressure conditions to be maintained in the furnace. Thus, the damper 32 acts as the furnace pressure control damper, and is controlled automatically during the melting cycle by the circuitry illustrated. In this connection, it is noted that the use of a damper and associated controls for automatically controlling furnace pressure is not new and does not form a part of this invention outside of the combination described.

During the refining and slagging cycle, the dampers 33 and 33a are opened by the valves 42 and 44a while the damper 32 is closed. As indicated, this permits collection of gases and dust issuing from the secondary openings. Since the damper 32 is closed, however, there will not be any significant negative pressure created in the furnace, and therefore large amounts of air will not enter the furnace and cause undesirable oxidation of the molten metal and slag.

It will be understood that various changes and modifications may be made in the above described system which provide the characteristics of this invention without departing from the spirit thereof, particularly as defined in the following claims.

That which is claimed is:

1. In an industrial furnace construction provided with primary and secondary openings, the improvement in furnace pressure-control and ventilation means comprising a first conduit means having an inlet opening facing said primary opening, a second conduit means having an independent inlet opening disposed to receive ambient air and gaseous issue from said secondary openings, said first and second conduit means defining independent outlet openings, said outlet openings communicating with a collecting system for the issue from the furnace, first damper means in said first conduit means, means for determining the gaseous pressure within said furnace, means for operating said first damper means between open and closed positions depending upon variations in gaseous pressure within said furnace, second damper means in said second conduit means, and control means having at least first and second operating positions, means for holding said second damper means in at least a substantially closed position when said control means is in said first position, and means for opening said second damper means and for holding said first damper means in at least a substantially closed position, and for also eliminating dependency of said first damper means on said pressure detecting means when said control means is in said second position.

2. A furnace construction according to claim 1 wherein said second conduit means defines a plurality of inlet openings located in spaced relationship with secondary outlet openings of said furnace.

3. A furnace construction according to claim 1 wherein said first and second conduit means extend to outlets situated in side-by-side relationship, and wherein a common inlet opening for said collecting system is located for communication with each of said outlets.

4. A furnace construction according to claim 1 wherein the inlet opening of said first conduit means overlies the principal furnace top openings and is positioned in closely spaced relationship thereto.

5. A furnace construction according to claim 1 comprising an electric arc furnace, said second opening including openings provided for the introduction of electrodes into the furnace, the inlet openings for said second conduit means being positioned in spaced relationship to said openings for the electrodes.

6. A furnace construction according to claim 5 wherein said secondary openings also include openings in the furnace door and pouring spout.

7. A furnace construction according to claim 1 comprising an electric arc furnace including a melting cycle and a refining and slagging cycle in its operation, said pressure detecting means operating said first damper means during the melting cycle to provide for control of the pressure within said furnace, and said control means being placed in said second position during said refining and slagging cycle to effect closure of said first damper means and opening of said second damper means.

8. A furnace construction according to claim 1 wherein at least some of said primary and secondary openings are located in the roof of the furnace.

References Cited

UNITED STATES PATENTS

| | | | |
|---|---|---|---|
| 1,895,878 | 1/1933 | Bunce et al. | 266—15 X |
| 2,268,918 | 1/1942 | Allan et al. | 266—15 |
| 2,857,444 | 10/1958 | Sem et al. | 266—31 X |
| 3,173,980 | 3/1965 | Hysinger | 266—15 X |
| 3,219,435 | 11/1965 | Gruber et al. | 75—10 |

J. SPENCER OVERHOLSER, Primary Examiner

J. E. ROETHEL, Assistant Examiner

U.S. Cl. X.R.

75—10; 122—7; 266—31